US011732607B2

(12) United States Patent
Shirakawa et al.

(10) Patent No.: US 11,732,607 B2
(45) Date of Patent: Aug. 22, 2023

(54) BEARING STRUCTURE, TURBOCHARGER HAVING THE SAME, AND ASSEMBLY METHOD OF TURBOCHARGER

(71) Applicant: MITSUBISHI HEAVY INDUSTRIES MARINE MACHINERY & EQUIPMENT CO., LTD., Nagasaki (JP)

(72) Inventors: Taiyo Shirakawa, Nagasaki (JP); Yasuhiro Wada, Nagasaki (JP); Yukihiro Iwasa, Nagasaki (JP); Tetsuya Matsuo, Nagasaki (JP)

(73) Assignee: MITSUBISHI HEAVY INDUSTRIES MARINE MACHINERY & EQUIPMENT CO., LTD., Nagasaki (JP)

( * ) Notice: Subject to any disclaimer, the term of this patent is extended or adjusted under 35 U.S.C. 154(b) by 0 days.

(21) Appl. No.: 17/430,562

(22) PCT Filed: Jan. 28, 2020

(86) PCT No.: PCT/JP2020/002954
§ 371 (c)(1),
(2) Date: Aug. 12, 2021

(87) PCT Pub. No.: WO2020/166318
PCT Pub. Date: Aug. 20, 2020

(65) Prior Publication Data
US 2022/0127972 A1 Apr. 28, 2022

(30) Foreign Application Priority Data
Feb. 14, 2019 (JP) ................................. 2019-024518

(51) Int. Cl.
*F01D 25/16* (2006.01)
*F02B 37/00* (2006.01)
(Continued)

(52) U.S. Cl.
CPC ............ *F01D 25/162* (2013.01); *F02B 37/00* (2013.01); *F02B 39/00* (2013.01); *F16C 17/10* (2013.01);
(Continued)

(58) Field of Classification Search
CPC ........ F01D 25/16; F01D 25/162; F01D 25/18; F02B 37/00; F02B 39/00; F02B 39/14;
(Continued)

(56) References Cited

U.S. PATENT DOCUMENTS 3,390,926 A * 7/1968 Woollenweber, Jr. .. F16C 17/10
384/291
4,256,441 A * 3/1981 Arora ...................... F16C 17/18
417/407

(Continued)

FOREIGN PATENT DOCUMENTS

CN    201407202 Y    2/2010
EP    3 425 220 A1   1/2019
(Continued)

OTHER PUBLICATIONS

International Search Report dated Mar. 24, 2020, issued in counterpart International application No. PCT/JP2020/002954, with English translation. (7 pages).

(Continued)

*Primary Examiner* — Jesse S Bogue
(74) *Attorney, Agent, or Firm* — WHDA, LLP

(57) ABSTRACT

Provided is a bearing structure that can support a rotary shaft with a small number of components. The bearing structure includes: a cylindrical sleeve (32) provided so as to surround the outer circumference of a rotary shaft (4) that rotates about a center axis line (CL) and configured to rotate together with the rotary shaft (4); thrust collars (34a, 34b) provided so as to abut against both ends in the center axis
(Continued)

line (CL) direction of the cylindrical sleeve (32), respectively, having a larger diameter than the cylindrical sleeve (32), and configured to rotate together with the rotary shaft (4); and a compressor-side journal bearing (12) arranged on the outer circumference side of the cylindrical sleeve (32) and between the thrust collars (34a, 34b).

6 Claims, 3 Drawing Sheets

(51) Int. Cl.
F02B 39/00 (2006.01)
F16C 17/10 (2006.01)
F16C 23/04 (2006.01)

(52) U.S. Cl.
CPC .......... F16C 23/04 (2013.01); *F05D 2220/40* (2013.01); *F05D 2230/60* (2013.01); *F05D 2240/52* (2013.01); *F05D 2240/54* (2013.01)

(58) Field of Classification Search
CPC ............. F05D 2220/40; F05D 2230/60; F05D 2240/52; F05D 2240/54; F05D 2260/98; F16C 17/10; F16C 17/107; F16C 23/04; F16C 2326/30; F16C 2360/24; F16C 33/1045; F16C 43/02
See application file for complete search history.

(56) References Cited

U.S. PATENT DOCUMENTS

| 4,453,837 | A | * | 6/1984 | Shimizu | F01D 25/168 |
| | | | | | 384/368 |
| 5,142,173 | A | | 8/1992 | Konno et al. | |
| 5,857,332 | A | * | 1/1999 | Johnston | H02K 7/14 |
| | | | | | 417/407 |
| 6,017,184 | A | * | 1/2000 | Aguilar | F04D 29/26 |
| | | | | | 415/105 |
| 6,418,722 | B1 | * | 7/2002 | Arnold | F01D 25/186 |
| | | | | | 417/407 |
| 8,845,271 | B2 | * | 9/2014 | Woollenweber | F01D 25/16 |
| | | | | | 416/174 |
| 9,790,812 | B2 | * | 10/2017 | Ryu | F16C 17/18 |
| 10,865,833 | B2 | * | 12/2020 | Kojima | F16C 33/106 |
| 2004/0228552 | A1 | | 11/2004 | Hayashi | |
| 2008/0232729 | A1 | * | 9/2008 | Petitjean | F01D 25/16 |
| | | | | | 384/284 |
| 2014/0169711 | A1 | * | 6/2014 | Hanaka | F16C 17/02 |
| | | | | | 384/284 |
| 2014/0233873 | A1 | * | 8/2014 | Hayashi | F16C 17/047 |
| | | | | | 384/123 |
| 2015/0354628 | A1 | | 12/2015 | Hemmi et al. | |
| 2017/0067472 | A1 | | 3/2017 | Day et al. | |
| 2017/0159708 | A1 | * | 6/2017 | Uneura | F16C 27/02 |
| 2018/0073553 | A1 | * | 3/2018 | Kleinschmidt | F16C 17/028 |
| 2019/0063496 | A1 | * | 2/2019 | Futae | F01D 25/18 |
| 2019/0078509 | A1 | | 3/2019 | Futae et al. | |
| 2021/0310372 | A1 | * | 10/2021 | Berger | F16C 17/105 |
| 2022/0065132 | A1 | * | 3/2022 | Berger | F01D 25/166 |
| 2022/0106891 | A1 | * | 4/2022 | Kojima | F02B 39/16 |

FOREIGN PATENT DOCUMENTS

| JP | S50-149710 U | 12/1975 |
| JP | S52-067442 A | 6/1977 |
| JP | S61-202648 U | 12/1986 |
| JP | S61-202649 U | 12/1986 |
| JP | S62-143818 U | 9/1987 |
| JP | S62-143819 U | 9/1987 |
| JP | H03-157513 A | 7/1991 |
| JP | 2004-332885 A | 11/2004 |
| JP | 2009-174358 A | 8/2009 |
| JP | 2014-149058 A | 8/2014 |
| JP | 2015-203454 A | 11/2015 |
| JP | 5860172 B2 | 2/2016 |
| JP | 2018-145942 A | 9/2018 |
| WO | 2014/038080 A1 | 3/2014 |

OTHER PUBLICATIONS

Written Opinion dated Mar. 24, 2020, issued in counterpart International application No. PCT/JP2020/002954, with English translation. (11 pages).

Extended (Supplementary) European Search Report dated Sep. 22, 2021, issued in counterpart EP application No. 20755528.5. (7 pages).

Office Action dated May 8, 2023, issued in counterpart CN Application No. 202080013707.X..(7 pages).

* cited by examiner

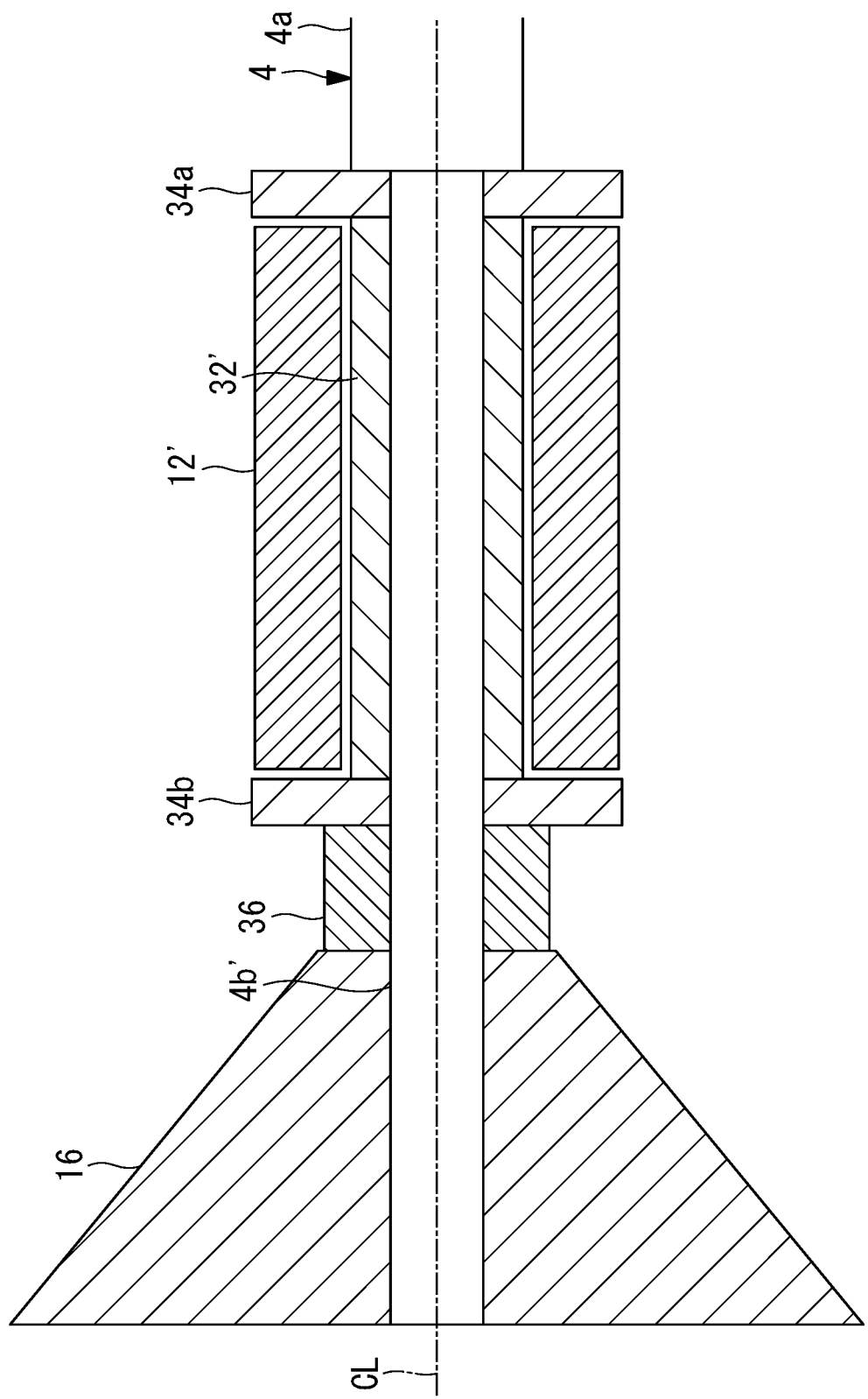

BEARING STRUCTURE, TURBOCHARGER HAVING THE SAME, AND ASSEMBLY METHOD OF TURBOCHARGER

TECHNICAL FIELD

The present disclosure relates to a bearing structure, a turbocharger having the same, and an assembly method of the turbocharger.

Background Art

In diesel engines used for ships or the like, for example, a turbocharger for supplying combustion air is used (see PTL 1). There is a demand for improved performance of turbochargers due to introduction of stricter environmental restrictions.

CITATION LIST

Patent Literature

{PTL 1}
Japanese Patent Application Laid-Open No. 2018-145942

SUMMARY OF INVENTION

Technical Problem

The turbocharger disclosed in PTL 1 has a journal bearing and a thrust bearing as separate bearings that support a rotary shaft used for rotating an impeller.

However, the configuration having the separate journal bearing and thrust bearing requires an increased number of components, which prevents reduction in size.

The present disclosure has been made in view of such circumstances and intends to provide a bearing structure that can support a rotary shaft with a small number of components, to provide a turbocharger having the bearing structure, and to provide an assembly method of the turbocharger.

Solution to Problem

The bearing structure according to one aspect of the present disclosure includes: a sleeve provided so as to surround an outer circumference of a rotary shaft that rotates about a center axis line and configured to rotate together with the rotary shaft; collars provided so as to abut against both ends in the center axis line direction of the sleeve, respectively, having a larger diameter than the sleeve, and configured to rotate together with the rotary shaft; and a bearing arranged on an outer circumference side of the sleeve and between the collars.

The sleeve that rotates together with the rotary shaft and the collars that rotates together with the rotary shaft so as to abut against both ends of the sleeve are provided. Further, the bearing is provided on an outer circumference side of the sleeve in a manner interposed between the collars. Accordingly, the bearing can support the rotary shaft in the radial direction via the sleeve and support the rotary shaft in the thrust direction via the collars. Since this allows a single bearing to function as a journal bearing and a thrust bearing, the number of components can be reduced, and a reduction in size can be realized.

Further, since the distance between the collars is defined by the sleeve, it is possible to suitably manage the thrust gap in the center axis line direction between the bearing and the collars.

Furthermore, in the bearing structure according to one aspect of the present disclosure, oil grooves are formed at both ends in the center axis line direction of the bearing.

The oil grooves are formed at both ends of the bearing. Accordingly, the lubricant is guided to both ends of the bearing, and both the ends of the bearing can thus be used as thrust pads. Therefore, since it is not required to provide thrust pads as separate components from the bearing, the number of components can be reduced.

Furthermore, in the bearing structure according to one aspect of the present disclosure, a lubricant supply hole with downstream side opened to an inner circumference side of the bearing is formed in the bearing.

The lubricant supply hole with the downstream side opened to the inner circumference side of the bearing is formed. Thus, after flowing out to the inner circumference side of the bearing, the lubricant passes through the radial gap between the inner circumference of the bearing and the outer circumference of the sleeve and then flows in the thrust gap between each end of the bearing and each collar. In such a way, after heated by friction heat and reduced in viscosity while passing through the radial gap, the lubricant flows in the thrust gap. By reducing the viscosity of the lubricant with a rise in temperature in such a way, it is possible to reduce a mechanical loss occurring in the thrust gap.

Further, a turbocharger according to one aspect of the present disclosure includes: an impeller; a rotary shaft to which the impeller is attached; and the bearing structure according to one aspect that supports the rotary shaft. The rotary shaft has a small diameter portion, a large diameter portion, and a step part connecting the small diameter portion to the large diameter portion. The sleeve and the collars are provided to the small diameter portion. One of the collars on the large diameter portion side is provided so as to abut against the step part. The turbocharger further includes a fastener that is attached to an end of the rotary shaft on the small diameter portion side and presses the collars and the sleeve toward the step part side.

The collars and the sleeve are pressed toward the step part side of the rotary shaft by using a fastener attached to the small diameter portion of the rotary shaft. Accordingly, the collars and the sleeve are fixed so as to rotate with the rotary shaft in an integrated manner.

Further, tension is applied to the small diameter portion of the rotary shaft between the fastener and the step part. Since the small diameter portion has larger extension due to elastic deformation than the large diameter portion, a tightening margin (extension margin) can be increased for the collars and the sleeve, and the tightening robustness can be improved.

Further, the turbocharger according to one aspect of the present disclosure further includes a journal bearing provided to the large diameter portion, and the sleeve has substantially the same outer diameter as the large diameter portion.

Because the outer diameter of the sleeve is substantially the same as that of the large diameter portion, the bearing and the journal bearing can have substantially the same inner diameter. It is thus possible to manage the inner diameters of the bearing and the journal bearing together.

Further, an assembly method of a turbocharger according to one aspect of the present disclosure is an assembly method of a turbocharger including an impeller, a rotary shaft to which the impeller is attached and that rotates about a center axis line, and a bearing structure that pivotably supports the rotary shaft, the rotary shaft has a small diameter portion, a large diameter portion, and a step part connecting the small diameter portion to the large diameter portion, and the bearing structure has a sleeve surrounding an outer circumference of the rotary shaft, collars provided so as to abut against both ends in the center axis line direction of the sleeve, respectively, and having a larger diameter than the sleeve, and a bearing arranged on an outer circumference side of the sleeve and between the collars. The assembly method includes: an arrangement step of inserting the collars and the sleeve to the small diameter portion and arranging the bearing between both the collars; an abutting step of abutting one of the collars against the step part; and a fixing step of pushing and fixing the impeller, the collars, and the sleeve against the step part by fixing a fastener to the small diameter portion.

The collars and the sleeve are pressed toward the step part side of the rotary shaft by using a fastener attached to the small diameter portion of the rotary shaft. Accordingly, the collars and the sleeve are fixed so as to rotate with the rotary shaft in an integrated manner.

Further, tension is applied to the small diameter portion of the rotary shaft between the fastener and the step part. Since the small diameter portion has larger extension due to elastic deformation than the large diameter portion, a tightening margin (extension margin) can be increased for the collars and the sleeve, and the tightening robustness can be improved.

Advantageous Effects of Invention

Since both the radial and thrust loads are supported by a bearing, the number of components can be reduced.

BRIEF DESCRIPTION OF DRAWINGS

FIG. 3 is a schematic vertical sectional view illustrating a modified example and corresponding to FIG. 2.

DESCRIPTION OF EMBODIMENTS

One embodiment according to the present disclosure will be described below with reference to the drawings.

Figure 1:
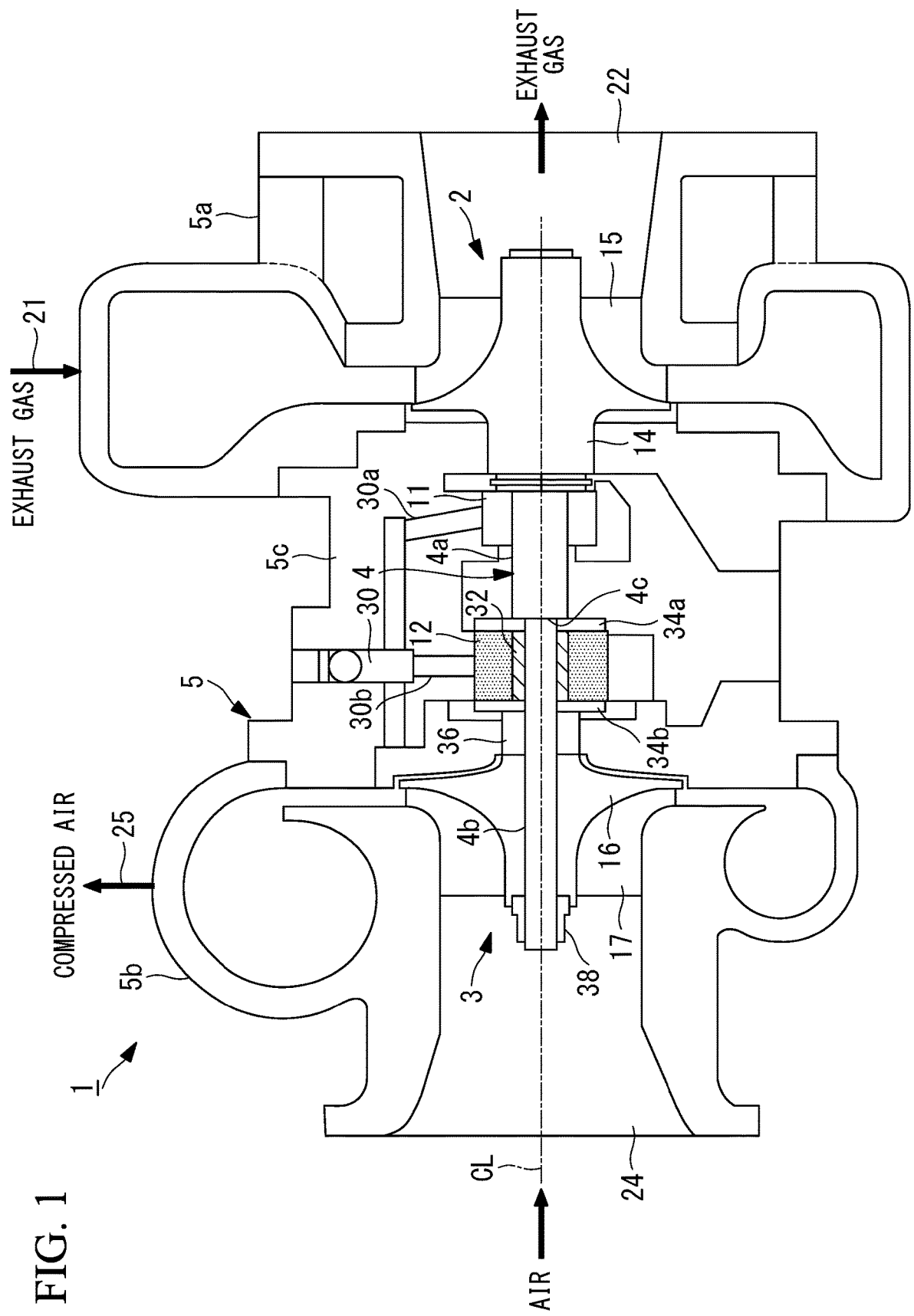
FIG. 1 is a vertical sectional view illustrating a turbocharger according to one embodiment of the present disclosure.

As illustrated in FIG. 1, a turbocharger 1 that is an exhaust gas turbine turbocharger is used in a diesel engine that is a main engine of a ship, for example. The turbocharger 1 has a turbine 2, a compressor 3, a rotary shaft 4, and a housing 5 accommodating these components. Note that the turbocharger 1 may be used as an auxiliary engine without being limited to the main engine.

The housing 5 has a hollow therein and has a turbine housing 5a accommodating the turbine 2, a compressor housing 5b accommodating the compressor 3, and a bearing housing 5c accommodating the rotary shaft 4. The bearing housing 5c is located between the turbine housing 5a and the compressor housing 5b.

A turbine wheel 14 of the turbine 2 is fixed to one end (the right end in FIG. 1) in the center axis line CL direction of the rotary shaft 4. A plurality of turbine blades 15 are provided to the turbine wheel 14 circumferentially at predetermined intervals. A compressor impeller 16 of the compressor 3 is fixed to the other end (the left end in FIG. 1) in the center axis line CL direction of the rotary shaft 4. A plurality of blades 17 are provided to the compressor impeller 16 at predetermined intervals in the circumferential direction.

The rotary shaft 4 is supported rotatably about the center axis line CL by a turbine-side journal bearing 11 on the turbine 2 side and supported rotatably about the center axis line CL by a compressor-side journal bearing (bearing) 12 on the compressor 3 side. The compressor-side journal bearing 12 also functions as a thrust bearing as described later.

An inlet passage 21 for an exhaust gas to the turbine blades 15 and an outlet passage 22 for the exhaust gas therefrom are provided to the turbine housing 5a. When the exhaust gas of a diesel engine is guided from the inlet passage 21 and passes through the turbine blades 15, the energy of the exhaust gas is converted into rotational energy of the turbine 2, and the rotary shaft 4 is rotated about the center axis line CL.

An intake port 24 for an air to the compressor impeller 16 and a discharge port 25 that discharges a compressed air are provided to the compressor housing 5b. The compressor impeller 16 is rotated by the rotational power obtained by the turbine 2, the air taken from the intake port 24 is compressed when passing through the blades 17 of the compressor impeller 16. The compressed air compressed by the compressor 3 is guided from the discharge port 25 to the diesel engine as a combustion air.

A lubricant supply path 30 used for supplying a lubricant to respective components such as the bearings 11 and 12 is provided in the bearing housing 5c. A turbine-side lubricant supply path 30a of the lubricant supply path 30 is connected to the outer circumference side of the turbine-side journal bearing 11. A compressor-side lubricant supply path 30b is connected to the outer circumference side of the compressor-side journal bearing 12.

[Bearing Structure]

Next, the bearing structure around the compressor-side journal bearing 12 will be described.

The rotary shaft 4 has a large diameter portion 4a on the turbine 2 side and a small diameter portion 4b on the compressor 3 side. The large diameter portion 4a and the small diameter portion 4b are connected to each other via a step part 4c. The step part 4c has a surface orthogonal to the center axis line CL.

A cylindrical sleeve (sleeve) 32 is provided on the inner circumference side of the compressor-side journal bearing 12. The cylindrical sleeve 32 has a cylindrical shape and is inserted so as to surround the small diameter portion 4b of the rotary shaft 4. A radial gap is formed between the outer circumference of the cylindrical sleeve 32 and the inner circumference of the compressor-side journal bearing 12, and a lubricant is guided into this radial gap so that the rotary shaft 4 is radially supported.

Thrust collars (collars) 34a and 34b are provided on both sides of the compressor-side journal bearing 12, respectively. Each of the thrust collars 34a and 34b has a disc shape, and the small diameter portion 4b of the rotary shaft 4 is inserted so as to penetrate the center of each of the thrust collars 34a and 34b. The outer diameter of each of the thrust collars 34a and 34b is larger than the outer diameter of the cylindrical sleeve 32. That is, respective thrust collars 34a and 34b radially protrude at both ends of the cylindrical sleeve 32. The end faces of respective thrust collars 34a and 34b are in contact with both the ends of the cylindrical sleeve 32, respectively.

The dimension in the center axis line CL direction of the cylindrical sleeve 32 is larger than the dimension in the center axis line CL direction of the compressor-side journal bearing 12. Thus, a predetermined thrust gap is formed between the compressor-side journal bearing 12, which has a shorter dimension in the center axis line CL direction than the cylindrical sleeve 32, and each of the thrust collars 34a and 34b. A lubricant is guided into the thrust gaps, and the rotary shaft 4 is supported in the thrust direction.

The compressor-side journal bearing 12 is arranged so as to be located in a region surrounded by the cylindrical sleeve 32 and the thrust collars 34a and 34b on both sides. The compressor-side journal bearing 12 is held so as to restrict circumferential pivot movement to the bearing housing 5c side.

At both ends of the compressor-side journal bearing 12, oil grooves 13 are formed in respective surfaces facing the thrust collars 34a and 34b. A plurality of oil grooves are provided circumferentially at predetermined intervals. A lubricant is retained in these oil grooves to form a liquid film, and thereby, thrust force applied to the compressor-side journal bearing 12 from the thrust collars 34a and 34b is supported. In such a way, with the oil grooves being provided at both the ends, the compressor-side journal bearing 12 also functions as thrust pads.

The thrust collar 34a on the turbine 2 side has a side end face on the turbine 2 side, and the side end face is in contact with the step part 4c of the rotary shaft 4. That is, the thrust collar 34a on the turbine 2 side abuts against the step part 4c and is unable to further move to the turbine 2 side in the center axis line CL direction.

The thrust collar 34b on the compressor 3 side has a side face on the compressor 3 side, and the side face is in contact with the end of an intermediate sleeve 36. The intermediate sleeve 36 has a cylindrical shape and is arranged to as to surround the rotary shaft 4. The end of the intermediate sleeve 36 on the compressor 3 side is in contact with the end of the compressor impeller 16.

A fixing nut (fastener) 38 is provided to the compressor impeller 16 on the tip side (intake side). The fixing nut 38 is screwed onto external threads formed in the tip (the left end in FIG. 1) of the small diameter portion 4b of the rotary shaft 4. When the fixing nut 38 is tightened, the compressor impeller 16, the intermediate sleeve 36, the thrust collar 34b, the cylindrical sleeve 32, and the thrust collar 34a in this order are pushed against the step part 4c of the rotary shaft 4. The compressor impeller 16, the intermediate sleeve 36, the thrust collar 34b, the cylindrical sleeve 32, and the thrust collar 34a are integrated with the rotary shaft 4 by such tightening of the fixing nut 38. Accordingly, the compressor impeller 16, the intermediate sleeve 36, the cylindrical sleeve 32, and the thrust collars 34a and 34b are rotated together with the rotary shaft 4.

Figure 2:
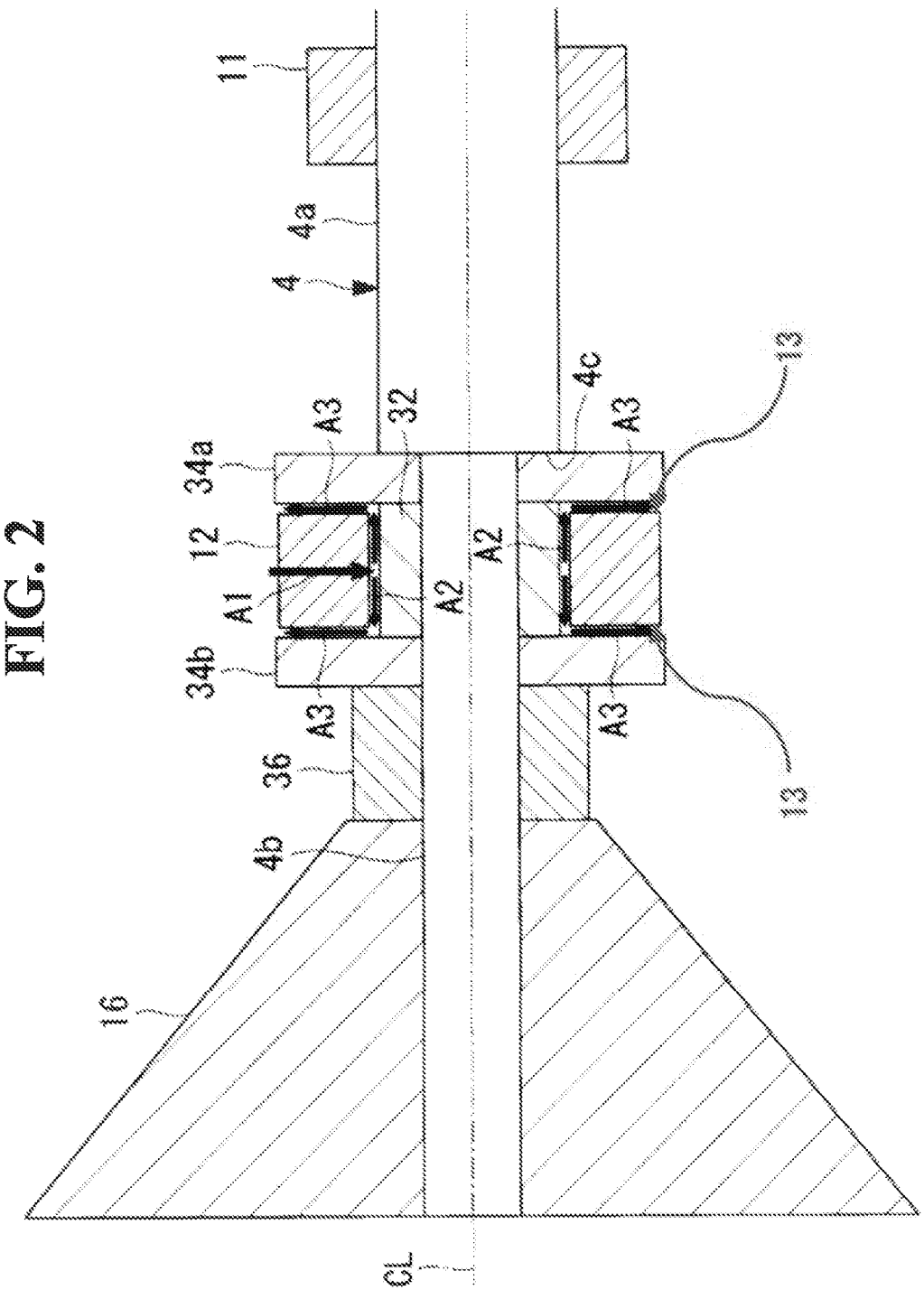
FIG. 2 is a schematic vertical sectional view illustrating a part around a compressor-side journal bearing of FIG. 1.

FIG. 2 illustrates the positional relationship of the compressor impeller 16, the intermediate sleeve 36, the thrust collar 34b, the cylindrical sleeve 32, and the thrust collar 34a as described above in a simplified manner.

It is preferable that the outer diameter of the cylindrical sleeve 32 be substantially the same as the outer diameter of the large diameter portion 4a of the rotary shaft 4. Accordingly, the inner diameter of the turbine-side journal bearing 11 that pivotably supports the large diameter portion 4a and the inner diameter of the compressor-side journal bearing 12 can be substantially the same.

FIG. 2 illustrates a path of a lubricant guided by the compressor-side lubricant supply path 30b (see FIG. 1). As indicated by the arrow A1, the lubricant passes through a lubricant supply hole formed radially in the compressor-side journal bearing 12 and opened to the inner circumference side of the compressor-side journal bearing 12. As indicated by the arrow A2, the lubricant is divided into both sides to flow through a radial gap between the inner circumference of the compressor-side journal bearing 12 and the outer circumference of the cylindrical sleeve 32 in the center axis line CL direction. Then, as indicated by the arrow A3, the lubricant flows in each thrust gap between the compressor-side journal bearing 12 and the thrust collars 34a and 34b. In such a way, the lubricant flows into the thrust gap after flowing through the radial gap.

The bearing structure around the compressor-side journal bearing 12 described above is assembled as follows.

The thrust collar 34a on the turbine 2 side is inserted to the small diameter portion 4b of the rotary shaft 4 and abutted against the step part 4c (abutting step).

The cylindrical sleeve 32 to which the compressor-side journal bearing 12 is fitted, the thrust collar 34b on the compressor 3 side, the intermediate sleeve 36, and the compressor impeller 16 are then inserted in this order. In such a way, arrangement is made such that the compressor-side journal bearing 12 is located between the thrust collars 34a and 34b (arrangement step).

Then, the fixing nut 38 is screwed onto the small diameter portion 4b of the rotary shaft 4, and thereby, the compressor impeller 16, the intermediate sleeve 36, the thrust collar 34b on the compressor 3 side, the cylindrical sleeve 32, and the thrust collar 34a on the turbine 2 side are abutted and pushed against and fixed to the step part 4c (fixing step). Accordingly, the compressor impeller 16, the intermediate sleeve 36, the thrust collar 34b on the compressor 3 side, the cylindrical sleeve 32, and the thrust collar 34a on the turbine 2 side are integrated with the rotary shaft 4 and rotated together with the rotary shaft 4.

As described above, according to the present embodiment, the following effects and advantages are achieved.

The cylindrical sleeve 32 rotated together with the rotary shaft 4 is provided, and the thrust collars 34a and 34b rotated together with the rotary shaft 4 so as to abut against both ends of the cylindrical sleeve 32 are provided. Further, the compressor-side journal bearing 12 is provided on the outer circumference side of the cylindrical sleeve 32 and in a manner interposed between both the thrust collars 34a and 34b. This enables the compressor-side journal bearing 12 to support the rotary shaft 4 in the radial direction via the cylindrical sleeve 32 and support the rotary shaft 4 in the thrust direction via the thrust collars 34a and 34b. Accordingly, since the single compressor-side journal bearing 12 can function as both a journal bearing and a thrust bearing, the number of components can be reduced, and a reduction in size can be realized.

Further, since the distance between the thrust collars 34a and 34b is defined by the cylindrical sleeve 32, it is possible to suitably manage the thrust gap between the compressor-side journal bearing 12 and each of the thrust collars 34a and 34b in the center axis line CL direction.

Oil grooves are formed at both the ends of the compressor-side journal bearing 12. Accordingly, a lubricant is guided to both the ends of the compressor-side journal bearing 12, and thereby, both the ends of the compressor-side journal bearing 12 can be used as thrust pads. Therefore, since it is not required to provide thrust pads as separate components from the compressor-side journal bearing 12, the number of components can be reduced.

The lubricant supply hole with the downstream side opened to the inner circumference side of the compressor-side journal bearing 12 is formed. Thus, after flowing out to the inner circumference side of the compressor-side journal bearing 12 (see the arrow A1 of FIG. 2), the lubricant passes through the radial gap between the inner circumference of the compressor-side journal bearing 12 and the outer circumference of the cylindrical sleeve 32 (see the arrow A2 of FIG. 2) and then flows in the thrust gap between the end of the compressor-side journal bearing 12 and each of the thrust collars 34a and 34b (see the arrow A3 of FIG. 2). In such a way, after heated by friction heat and reduced in viscosity while passing through the radial gap, the lubricant flows in the thrust gap. By reducing the viscosity of the lubricant with a rise in temperature in such a way, it is possible to reduce a mechanical loss occurring in the thrust gap.

The thrust collars 34a and 34b and the cylindrical sleeve 32 are pressed toward the step part 4c side of the rotary shaft 4 by the fixing nut 38 attached to the small diameter portion 4b of the rotary shaft 4. Accordingly, the thrust collars 34a and 34b and the cylindrical sleeve 32 are fixed so as to rotate with the rotary shaft 4 in an integrated manner.

Further, tension is applied to the small diameter portion 4b of the rotary shaft 4 between the fixing nut 38 and the step part 4c. Since the small diameter portion 4b has larger extension due to elastic deformation than the large diameter portion 4a, a tightening margin (extension margin) can be increased for the thrust collars 34a and 34b and the cylindrical sleeve 32, and the tightening robustness can be improved.

When the cylindrical sleeve 32 and the large diameter portion 4a of the rotary shaft 4 have substantially the same outer diameters, the compressor-side journal bearing 12 and the turbine-side journal bearing 11 can have substantially the same inner diameter. It is thus possible to manage the inner diameters of the compressor-side journal bearing 12 and the turbine-side journal bearing 11 together.

Further, by suitably adjusting the radial thickness of the cylindrical sleeve 32, it is possible to change the diameter of the small diameter portion 4b of the rotary shaft 4. This enables adjustment of the extension amount of the small diameter portion 4b when tightened by the fixing nut 38. Further, by adjusting the contact area between the thrust collar 34a on the turbine 2 side and the step part 4c of the rotary shaft 4, it is possible to suitably set the friction force.

Modified Example

Note that the present embodiment can be modified as illustrated in FIG. 3.

As illustrated in FIG. 3, a single journal bearing may be provided. Specifically, a compressor-side journal bearing 12' is provided which is formed such that the compressor-side journal bearing 12 illustrated in FIG. 2 is extended in the center axis line CL direction, and a cylindrical sleeve 32' is provided which is formed such that the cylindrical sleeve 32 illustrated in FIG. 2 is extended in the center axis line CL direction. This also involves extension of a small diameter portion 4b' in the center axis line CL direction. Accordingly, since whirling about the center axis line CL of the rotary shaft 4 can be supported by the single compressor-side journal bearing 12', the turbine-side journal bearing 11 illustrated in FIG. 2 can be omitted.

Note that, although the turbocharger 1 is applied to the diesel engine used as a ship main engine in the embodiment described above, the present disclosure is not limited thereto. For example, the present disclosure can be used for a diesel engine other than a ship main engine or can be used for an internal-combustion engine other than a diesel engine.

REFERENCE SIGNS LIST

1 turbocharger
2 turbine
3 compressor
4 rotary shaft
4a large diameter portion
4b, 4b' small diameter portion
4c step part
5 housing
5a turbine housing
5b compressor housing
5c bearing housing
11 turbine-side journal bearing
12, 12' compressor-side journal bearing
13 oil groove
14 turbine wheel
15 turbine blade
16 compressor impeller
17 blade
21 inlet passage
22 outlet passage
24 intake port
25 discharge port
30 lubricant supply path
30a turbine-side lubricant supply path
30b compressor-side lubricant supply path
32, 32' cylindrical sleeve (sleeve)
34a thrust collar (on the turbine side)
34b thrust collar (on the compressor side)
36 intermediate sleeve
38 fixing nut (fastener)
CL center axis line

The invention claimed is:

1. A turbocharger comprising:
an impeller;
a rotary shaft to which the impeller is attached; and
a bearing structure that supports the rotary shaft,
wherein the rotary shaft comprises a small diameter portion, a large diameter portion, and a step part connecting the small diameter portion to the large diameter portion,
wherein the bearing structure comprises
a sleeve provided so as to surround an outer circumference of the rotary shaft that rotates about a center axis line and configured to rotate together with the rotary shaft,
collars provided so as to abut against both ends in the center axis line direction of the sleeve, respectively, having a larger diameter than the sleeve, and configured to rotate together with the rotary shaft, and
a bearing arranged on an outer circumference side of the sleeve and between the collars,
wherein the bearing functions as a journal bearing that supports the rotary shaft primarily in a radial direction via the sleeve and functions as a thrust bearing that supports the rotary shaft in a thrust direction via the collars,
wherein the sleeve and the collars are provided on the small diameter portion, and
wherein one of the collars on the large diameter portion side is provided so as to abut against the step part,
the turbocharger further comprising:
a fastener that is attached to an end of the rotary shaft on the small diameter portion side and presses the collars and the sleeve toward the step part side; and
a journal bearing provided on the large diameter portion, wherein the sleeve has substantially the same outer diameter as the large diameter portion.

2. The turbocharger according to claim 1, wherein oil grooves are formed at both ends in the center axis line direction of the bearing.

3. The turbocharger according to claim 1, wherein a lubricant supply hole with downstream side opened to an inner circumference side of the bearing is formed in the bearing.

4. The turbocharger according to claim 1 further comprising a turbine wheel,
wherein the impeller is a compressor impeller,
wherein the turbine wheel is fixed to one end of the rotary shaft in a direction of the center axis line, and the compressor impeller is fixed to another end of the rotary shaft in the direction of the center axis line,
wherein the bearing structure supports the rotary shaft on the compressor impeller side, and
wherein the journal bearing supports the rotary shaft on the turbine wheel side.

5. An assembly method of a turbocharger comprising an impeller, a rotary shaft to which the impeller is attached and that rotates about a center axis line, and a bearing structure that pivotably supports the rotary shaft,
wherein the rotary shaft comprises a small diameter portion, a large diameter portion, and a step part connecting the small diameter portion to the large diameter portion,
wherein the bearing structure comprises a sleeve surrounding an outer circumference of the rotary shaft, collars provided so as to abut against both ends in the center axis line direction of the sleeve, respectively, and having a larger diameter than the sleeve, and a bearing arranged on an outer circumference side of the sleeve and between the collars,
wherein the bearing functions as a journal bearing that supports the rotary shaft primarily in a radial direction via the sleeve and functions as a thrust bearing that supports the rotary shaft in a thrust direction via the collars,
wherein the turbocharger further comprises a journal bearing provided on the large diameter portion, and
wherein the sleeve has substantially the same outer diameter as the large diameter portion,
the assembly method comprising:
an arrangement step of inserting the collars and the sleeve to the small diameter portion and arranging the bearing between both the collars;
an abutting step of abutting one of the collars against the step part; and
a fixing step of pushing and fixing the impeller, the collars, and the sleeve against the step part by fixing a fastener to the small diameter portion.

6. The assembly method of a turbocharger according to claim 5 further comprising a turbine wheel,
wherein the impeller is a compressor impeller,
wherein the turbine wheel is fixed to one end of the rotary shaft in a direction of the center axis line, and the compressor impeller is fixed to another end of the rotary shaft in the direction of the center axis line,
wherein the bearing structure supports the rotary shaft on the compressor impeller side, and
wherein the journal bearing supports the rotary shaft on the turbine wheel side.

* * * * *